(12) United States Patent
Huerta et al.

(10) Patent No.: US 6,998,948 B2
(45) Date of Patent: Feb. 14, 2006

(54) HOLLOW PLUNGER WITH GUIDE INTEGRATED TO BOBBIN ASSEMBLY

(75) Inventors: Rolando Huerta, Chihuahua (MX); Conrado Carrillo, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 113 days.

(21) Appl. No.: 10/784,051

(22) Filed: Feb. 20, 2004

(65) Prior Publication Data

US 2005/0184843 A1   Aug. 25, 2005

(51) Int. Cl.
*H01F 3/00* (2006.01)
(52) U.S. Cl. ............................. 335/251; 335/262
(58) Field of Classification Search ........ 335/220–234, 335/251, 256, 219, 262; 251/129.01–129.19
See application file for complete search history.

(56) References Cited

U.S. PATENT DOCUMENTS 5,160,116 A * 11/1992 Sugiura et al. ........ 251/129.14

* cited by examiner

*Primary Examiner*—Lincoln Donovan
(74) *Attorney, Agent, or Firm*—Jimmy L. Funke

(57) ABSTRACT

An actuator suitable for use with a fluid flow control valve includes a frame, a bobbin, a coil and a plunger assembly. The frame is generally cylindrical and has a longitudinal axis. The bobbin, which is wound with the coil, includes a central cavity. The plunger assembly is received within the central cavity and includes a plunger portion and a rod portion. The plunger portion is formed of magnetic material. The rod portion may be snapped on the plunger portion to form the plunger assembly. The plunger assembly is configured to move within the cavity in response to an actuator control signal applied to the magnetic coil. Separating the plunger portion and the rod portion improves manufacturability as well as reduces the occurrence of rod damage.

16 Claims, 2 Drawing Sheets

HOLLOW PLUNGER WITH GUIDE INTEGRATED TO BOBBIN ASSEMBLY

TECHNICAL FIELD

The present invention relates to an actuator, and more particularly, to an actuator having a hollow plunger positioned in a housing used for fluid flow control.

BACKGROUND OF THE INVENTION

Solenoid actuators are well known in fluid flow control, where an orifice or aperture in a fluid flow path is to be opened or closed by means of a closure member such as a plunger, rod, spool or the like. Such actuators commonly comprise a magnetic circuit including a flux-generating coil, and a plunger formed of magnetic material moving under the influence of a magnetic field that changes in response to varying current flow through the coil. The plunger may be mechanically coupled to the closure member, which opens or closes the aperture or orifice in the fluid flow path as the plunger moves in accordance with changes in the magnetic field.

In a particular arrangement, it is known to use a solenoid actuator as part of a camshaft control system (i.e., cam phaser position control). As known, the camshaft of an internal combustion engine may be employed to control the opening/closing of engine valves (e.g., intake, exhaust). As further background, then, cam phasing may be understood as the shifting of valve events in a crank angle (or cam angle) domain. Typically, a mechanical device is attached to the end of the camshaft for such purpose ("cam phaser"). The cam phaser may include an oil-actuated piston coupled to a gear train, a spool control valve for controlling the flow of oil to the piston, and an actuator for controlling the spool control valve. The actuator is driven by a pulse width modulated (PWM) signal from an engine control unit. The actuator includes a forward rod that extends into the spool valve and acts as a closure member, opening/closing various ports. As the duty cycle of the PWM signal is varied, the rod is caused to move to a controlled depth in the spool valve, controlling the flow of oil, for example, to one side or the other of the above-mentioned piston, thereby in-effect actuating the gear train in a controlled fashion. The gear train moves the camshaft. FIG. 1 is a cross-sectional, side view showing a conventional solenoid actuator 10 used in connection with the above-described cam phaser. Actuator 10 includes a solid plunger 12 having a rod portion 13, a cup 14, a magnetic coil 16, a secondary plate 18, a washer 20 and a bobbin 22. Plunger 12 is a solid piece of ferromagnetic material, conical in shape at the front or at the tip, and is typically machined from a steel bar. Plunger 12 is also shown to include a plurality of axially extending flutes 24 formed in the outer surface of plunger 12. Flutes 24 interact with the oil for damping and hydraulic force compensation. FIG. 1 is taken in section through a pair of such flutes; thus, flutes 24 shown in FIG. 1 are shown without cross-hatching. Cup 14 acts as a guide for plunger 12 and additionally isolates plunger 12 from secondary plate 18. Cup 14 is a deep drawn component that is supported inside bobbin 22 to avoid fractures of the cup itself. Washer 20 is used as a magnetic brake between plunger 12 and primary plate 18. In operation, plunger 12 moves within cup 14 in accordance with the magnetic force induced by the magnetic flux produced by coil 16. Rod portion 13 is configured to extend into a spool control valve (not shown) for controlling oil flow, as described above. However, there are several shortcomings.

First, the rod portion 13 of the integral plunger/rod 12 may become bent during the manufacturing operation (e.g., machining) or shipping, which may result in an inoperable actuator when assembled and tested. Second, the flutes, among other features, are relatively complex to manufacture. Third, the inside diameter surface of cup 14 (i.e., the guide) and the outside diameter surface of plunger 12 (i.e., the guided part) are coextensive over a relatively large area, thus increasing drag or friction therebetween. Fourth, a hydraulic lock (i.e., sticking) condition may occur when the rear of plunger 12 contacts the closed end of cup 14.

There is therefore a need for an improved actuator that minimizes or eliminates one or more of the shortcomings set forth above.

SUMMARY OF THE INVENTION

One object of the present invention is to provide a solution to one or more of the problems set forth in the Background. According to one aspect of the present invention, the rod portion is decoupled from the plunger portion. This has the advantage of easing manufacturing as well as reducing the risk of bent rods during manufacturing and/or shipping. In a preferred embodiment, the rod portion comprises plastic material, which has an increased measure of elasticity compared to ferromagnetic material required for the plunger portion. In this preferred embodiment, the rod portion is configured to "snap" on a correspondingly-shaped end of the plunger. Another advantage of the present invention is that it eliminates the difficult to manufacture flutes referred to above that compensate for the damping and hydraulic forces effect of the oil. Rather, in another preferred embodiment, the rod portion and the plunger portion are both "hollow" providing a centrally disposed fluid pathway for damping/hydraulic force compensation. Still another advantage of the present invention is a guiding mechanism that exhibits reduced drag/friction, and which is preferably integral with a bobbin portion of the actuator.

A solenoid portion of an actuator according to the present invention comprises a frame, a bobbin, a coil on the bobbin and a plunger assembly. The frame, which is part of the magnetic circuit is a deep drawn can produced from a magnetic sheet of steel, includes a longitudinal axis. The bobbin is disposed in the frame and includes a central cavity. The coil, which is wound on the bobbin, is provided for producing a magnetic field in at least the central cavity in response to a control signal applied to the coil. The plunger assembly is movably disposed in the central cavity. The plunger assembly includes a plunger portion secured to a rod portion. The plunger portion is formed of magnetic material to thereby be influenced by the magnetic field.

In a preferred embodiment, the rod portion comprises plastic material configured to allow a predetermined amount of elastic deformation. The rod portion is removably secured to the plunger portion by way of a snap fit onto a forward end of the plunger portion. The foregoing reduces the occurrence of bent rods.

In another aspect of the invention, both the rod portion and the plunger portion include respective through-bores. When secured to each other, the through-bores are in fluid communication. Through the foregoing, fluid damping/hydraulic force compensation may be obtained using the through-bores. This feature is an improvement over the conventional design, which relied on flutes machined on an outer surface of the steel rod that formed the plunger, which involved an expensive and relatively complex process.

In yet another aspect of the invention, a guide is provided for maintaining alignment of the plunger assembly as it moves within the cavity. Preferably, the guide mechanism is integral with the bobbin, and includes a guiding post projecting axially into the cavity from a closed end of the bobbin cavity. A pair of guiding discs, offset one from another, extend radially outwardly from the guiding post. The diameter of the guiding discs is selected so as to correspond to the diameter of the through-bore in the plunger portion. This guide exhibits a reduced drag or friction characteristic inasmuch as the surface area of the outer periphery of the guiding discs facing the inner diameter of the plunger through-bore is substantially reduced compared to conventional approaches, which implement the guiding function using substantially the entire outer surface area of the plunger.

Other objects, features and advantages will become apparent to those of ordinary skill in the art from the following detailed description of the preferred embodiments taken in connection with the drawings.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 2A:
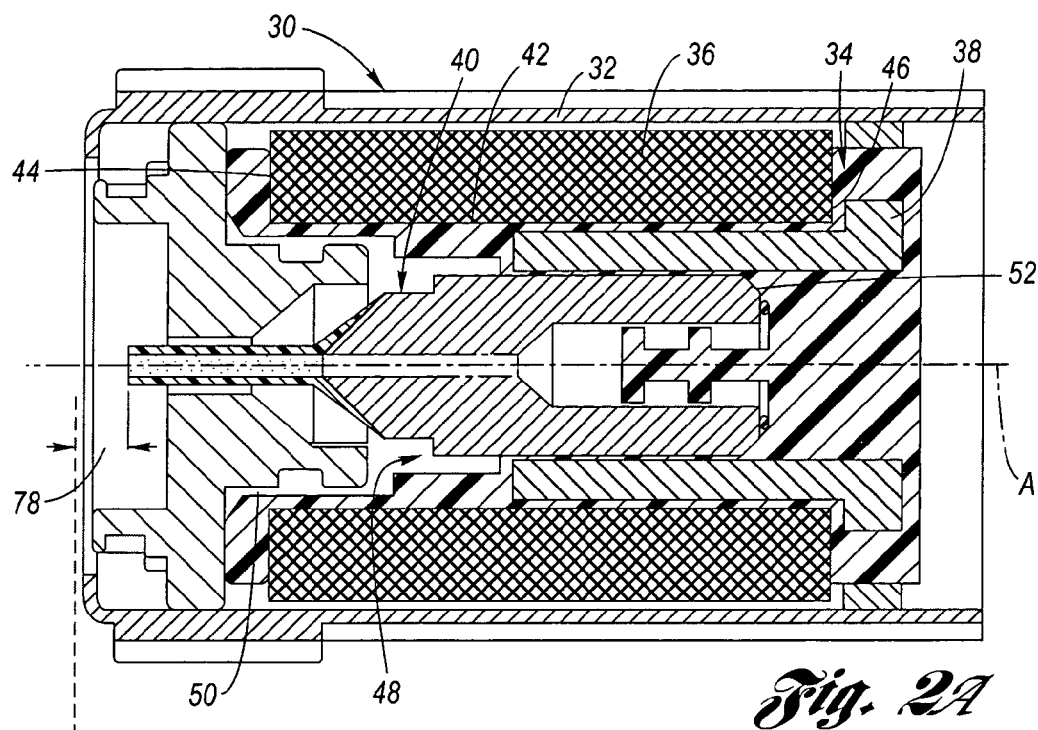
FIG. 2A is a side, cross-sectional view of an actuator according to the invention, in a de-energized state.

Referring now to the drawings in which the same reference numerals are used to identify identical components in the various views, FIG. 2A shows an actuator 30 in accordance with the present invention. Actuator 30, in FIG. 2A, is illustrated in a de-energized state and accordingly is shown in a fully retracted position (i.e., 0 mm of travel or stroke).

With continued reference to FIG. 2A, actuator 30 includes a frame 32, a bobbin 34, a coil 36, a magnetic plate 38, and a plunger assembly 40.

Frame 32 is configured to retain the main, internal components of actuator 30. Frame 32 may be generally cylindrical, having a longitudinal axis designated "A" in the drawings. Frame 32 may comprise metal material for strength and durability and magnetic properties.

Bobbin 34 is disposed in housing 32 and is provided with a winding surface 42 and axially opposing winding flanges 44, 46 configured to receive coil 36. Bobbin 34 further includes a central cavity 48 configured in size and shape to, among other things, receive plunger assembly 40. In the illustrated embodiment, the cavity 48 is sized (oversized) to accommodate plunger assembly 40 yet allow for a defined fluid path to be formed around plunger assembly 40.

Figure 2B:
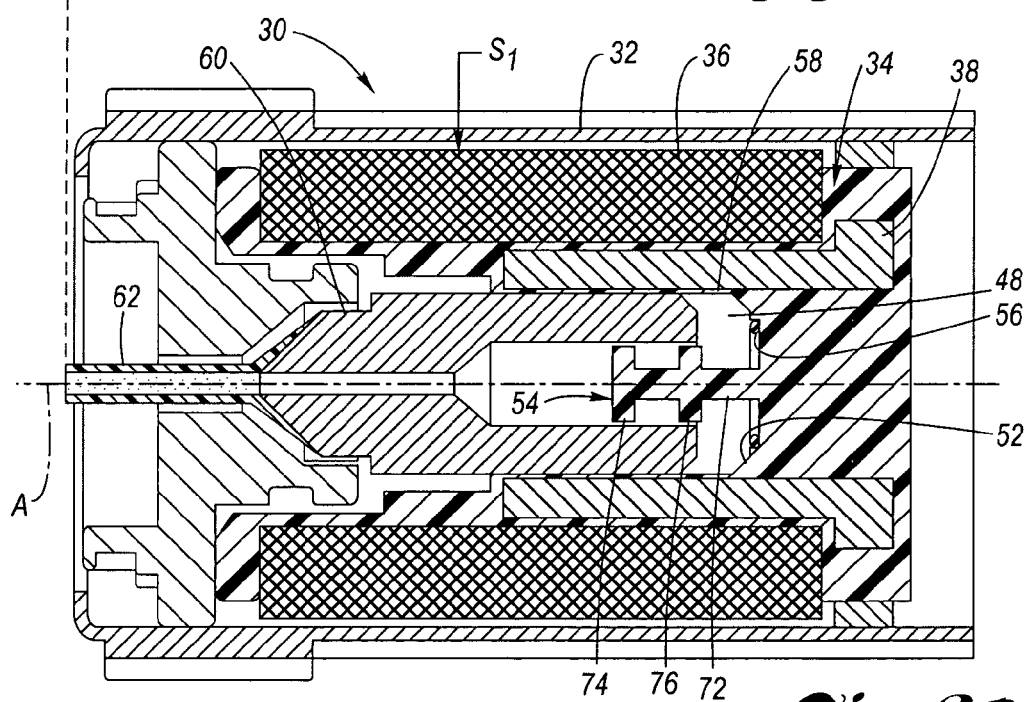
FIG. 2B is a side, cross-sectional view of the actuator of FIG. 2A, in a fully energized state.

With reference to FIG. 2B, central cavity 48 includes an open end 50 and an axially opposing closed end 52. In addition, bobbin 34 is further formed with an integral guide 54, to be described in greater below, as well as with an integral mechanical stop 56. Bobbin 34, in a constructed embodiment, comprises electrically insulating material, such as various types of plastic, as known to those of ordinary skill in the art.

Coil 36 is configured to establish a magnetic field in at least the central cavity 48 in response to an actuator control signal, designated $S_1$ applied to coil 36. As shown, coil 36 is wound on bobbin 34, particularly on winding surface 42. Coil 36 may comprise magnetic wire, having suitable electrical characteristics (e.g., AWG) and a desired number of turns to achieve a predefined magnetic field strength, as within the knowledge of one of ordinary skill in the art.

Magnetic plate 38 is configured as part of the magnetic circuit of actuator 30, as known to those of ordinary skill in the art. Plate 38 may be annular in shape and comprise magnetic material, for example, ferromagnetic material. In a preferred embodiment, plate 38 is insert molded directly into bobbin 34 in such a way so as to leave an annular isolation layer 58 between plunger assembly 40 in the cavity 48, on the one hand, and the inside diameter surface of annular plate 38, on the other hand. This isolation layer 58 is configured to minimize and/or prevent magnetic lock between plunger assembly 40 and magnetic plate 38 when plunger assembly 40 moves in cavity 48.

Plunger assembly 40 is movably disposed in central cavity 48. Plunger assembly 40 includes a plunger portion 60 and a rod portion 62 removably secured to plunger portion 60.

Figure 3:
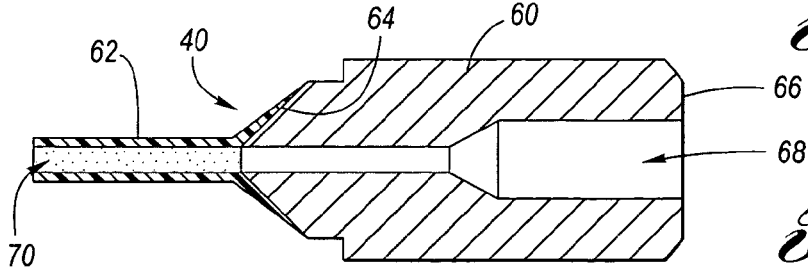
FIG. 3 is a cross-sectional view of a plunger assembly included in the actuators of FIGS. 2A and 2B.

FIG. 3 is an enlarged, cross-section view of plunger assembly 40. In accordance with one aspect of the present invention, plunger portion 60 is decoupled and is a separate part from rod portion 62; that is, plunger portion 60 and rod portion 62 are not integral but may be secured to each other.

Plunger portion 60 comprises magnetically permeable material and preferably comprises ferromagnetic material so as to be influenced by the magnetic field generated by coil 36. Plunger portion further includes a forward end 64 and an axially opposite back end 66. In the illustrated embodiment, the forward end 64 of the plunger portion 60 has a conical shape for a purpose to be described below. The back end is generally flat, as shown. In addition, plunger portion 60 includes a through-bore 68.

Figure 1:
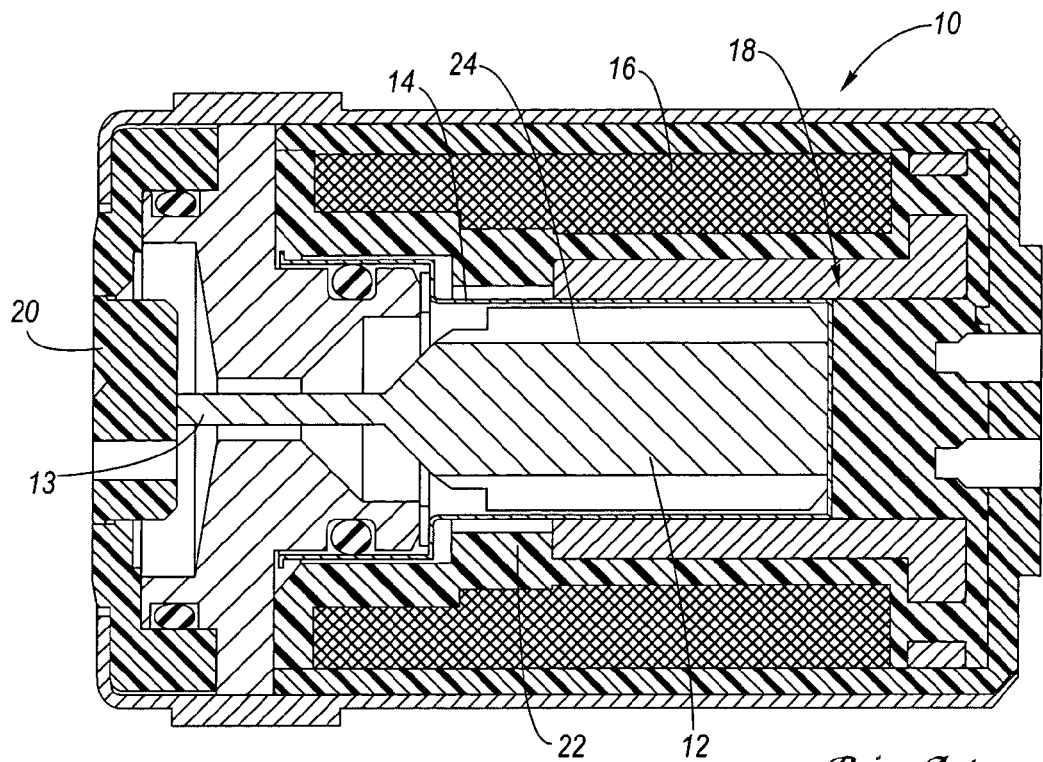
FIG. 1 is a side, cross-sectional view of a conventional actuator.

Rod portion 62 includes a centrally-disposed through-bore 70. In addition, rod portion 62, at a first end thereof, has a funnel shape. The funnel shape at end 62 and the conical shape of the forward end 64 of plunger portion 60 correspond in both size and shape. Rod portion 62 comprises plastic or other material that possesses enough strength and durability suitable for the intended application, and, in addition, possesses a predetermined measure of elastic deformation. Through the foregoing, in one embodiment, the rod portion 62 may be removably secured to the plunger portion 60 by way of a snap fit of the funnel-shaped end of the rod onto the cone shaped end of the plunger (i.e., funnel-to-conical ends). While this is the preferred method of securing the rod portion to the plunger portion since it provides the advantage of ease of manufacturability and assembly ("snap"), other conventional approaches are within the spirit and scope of the present invention. Since rod 62 is made of non-magnetic material, it eliminates the need for a washer as required in conventional designs (e.g., FIG. 1), which acted as a magnetic brake between a primary plate (not shown) and the plunger. Additionally, the "hollow" rod portion 62 increases manufacturability by eliminating the machined flutes required by conventional systems for fluid flow/damping/hydraulic force compensation, as described in the Background.

In accordance with the present invention, producing rod portion 62 having a predetermined amount of allowable elastic deformation reduces the occurrence of "bent" rod ends present in the prior "plunger," as described in the Background. The occurrence is reduced because (i) the use of plastic provides a degree elastic deformation, and (ii) the rod portions can be handled/shipped separately with specific attention to protecting the extended rods. This improvement reduces the occurrence of failed actuators, for example, after initial assembly and test.

When rod portion 62 is secured to plunger portion 60, the through-bores 68 and 70 are in fluid communication, one with the other, and are configured for fluid (e.g., oil) flow. In the illustrated embodiment, through-bore 68 is in registry with through-bore 70. In accordance with another aspect of the present invention, making the plunger assembly 40 "hollow" allows for the replacement of the flutes known in the art, as described in the Background. The through-bores 68, 70 are configured for fluid damping and to provide compensation of hydraulic forces in actuator 30 (i.e., the fluid can flow to the back end of the plunger assembly and thereafter surround the plunger assembly back to the front, equalizing the fluid pressure to some significant extent). Providing plunger assembly 40 that is "hollow" for achieving fluid dynamics control is an approach that is easier to implement that providing externally-formed flutes or the like.

With continued reference to FIG. 2B, guide 54 is configured to cooperate with plunger portion 60, particularly through-bore 68, to align plunger assembly 40 within cavity 48. This improved alignment also optimizes, i.e., reduces variation, in the air gaps. Guide 54 is preferably integrated with bobbin 34. In the illustrated embodiment, guide 54 includes a guide post 72 that extends axially away from the closed end 52 into cavity 48. Post 72, again in the illustrated embodiment, has a pair of annular guiding discs 74, 76 extending radially outwardly from post 72. One of the pair of discs 74 is axially offset from the other one of the pair of discs 76. Each of the pair of discs 74, 76 has a diameter corresponding to the diameter of through-bore 68 at the back end of plunger portion 60.

In accordance with yet another aspect of the present invention, the guide 54 is operative to reduce drag or friction compared to conventional approaches. Guide 54 helps reduce the "contact" or facing surface area between the plunger portion 60 and the remainder of the actuator. As described in the Background, the plunger (metal) in a conventional product, was disposed in a metallic guide cup. A very large portion of the inside diameter of the cup and the outside diameter of the plunger were coextensive, increasing drag/friction. In the present invention, the guiding function is performed by the pair of discs that collectively have a greatly reduced surface area in "contact" with the through-bore 68 of plunger assembly 60. In addition, the outside diameter of plunger portion 60 is surrounded by a plastic or other nonmetallic material that makes up the bobbin 34.

Guide 54 further includes a stop feature 56 configured to minimize contact of the back end of plunger portion 60 with the closed end 52 of cavity 48. This stop feature is configured to reduce the occurrence of hydraulic lock that could occur when the back end contacts the closed end of the cavity.

A description of the operation of actuator 30 will now be set forth. When the actuator control signal $S_1$ applied to coil 36 is discontinued (i.e., is zero), plunger assembly 40 assumes its initial, rest, de-energized position, as shown in FIG. 2A. However, when the actuator control signal $S_1$ in a non-zero state is applied to actuator 30, particularly coil 36 in the preferred embodiment, a magnetic field is established, as least in cavity 48. Plunger assembly 40 will move out of cavity 48 (i.e., away from closed end 52). The degree to which plunger assembly 40 will move can depend on the duty cycle of the signal $S_1$. Accordingly, plunger assembly 40 moves forward, as shown in FIG. 2B. Rod 62, for example when coupled to a spool valve as described in the Background, as it moves within such a spool valve (not shown), may operate as a closure member, opening/closing various ports.

FIG. 2B is representative of actuator 30 of FIG. 2A in a fully energized state. In one embodiment, the fully energized state corresponds to a 3 mm maximum stroke of rod 62. This maximum excursion, designated by reference numeral 78, may occur when a maximum magnetic force is induced at the maximum duty cycle. The actuator 30 may thus be arranged as a proportional actuator that can be commanded to any position from a fully retracted position (e.g., 0 mm of stroke) to a fully extended position (e.g., 3 mm of stroke).

For example only, actuator 30 may be energized with a pulse width modulated (PWM) voltage signal that can operate from 100 Hertz (Hz) to 300 (Hz).

Figure 4:
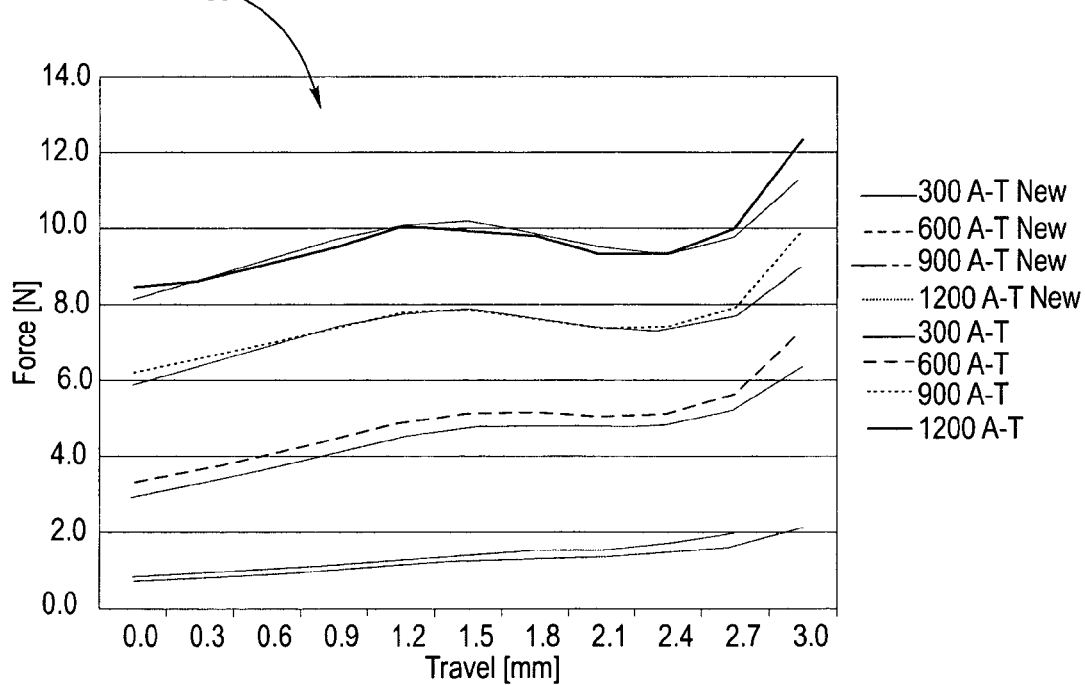
FIG. 4 is a graph illustrating a force operating characteristic associated with the actuator of FIGS. 2A and 2B.

FIG. 4 represents the operating characteristics of the solenoid actuator 30 of the present invention. A force vs. travel graph is generally indicated by reference numeral 80. The operating characteristic of a conventional, solid plunger type solenoid actuator is represented by dashed lines, while the present invention is represented by solid lines. Graph 80 illustrates that although the amount of magnetic material in the plunger portion has been reduced relative to the conventional design ("hollow" versus "solid"), the overall magnetic operating characteristic curves are not significantly affected.

Actuator 30 may be usefully employed, for example only, as part of a cam phasing system, which may be used to improve engine performance, increase fuel economy and lower emissions, as set forth in a publication entitled *A Verification Study for Cam Phaser Position Control using Robust Engineering Techniques*, Society of Automotive Engineers (SAE) Publication No. 2001-01-0777, as described in the Background, and which is hereby incorporated by reference in its entirety.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

The invention claimed is:

1. An actuator comprising:
  a frame having a longitudinal axis;
  a bobbin disposed in said frame, said bobbin having a central cavity;
  a coil wound on said bobbin for producing a magnetic field in at least said central cavity in response to a control signal applied thereto; and
  a plunger assembly movably disposed in said central cavity, said plunger assembly having a plunger portion secured to a rod portion, said plunger portion comprising magnetic material, wherein said rod portion comprises plastic material configured to allow a predetermined amount of elastic deformation, said rod portion being removably secured to said plunger portion by way of a snap fit onto a forward end of said plunger portion.

2. The actuator of claim 1 wherein said rod portion has a first end having a funnel shape, said forward end of said plunger portion having a conical shape corresponding to said funnel shape.

3. The actuator of claim 1 wherein said rod portion has a first through-bore, said plunger portion having a second through-bore, said first through-bore being in communication with said second through-bore when said rod portion is secured to said plunger portion.

4. The actuator of claim 3 wherein said first and second through-bores are configured for fluid flow.

5. The actuator of claim 4 wherein said first and second through-bores are configured for fluid damping and compensation of hydraulic forces in said actuator.

6. The actuator of claim 1 wherein said cavity includes a closed end, said bobbin further including a guide axially extending from said closed end into said cavity, said guide being configured to align said plunger assembly within said cavity.

7. The actuator of claim 6 wherein said plunger portion includes a back end axially opposite said forward end, said second through-bore at said back end being configured to receive said guide therein.

8. The actuator of claim 6 wherein said guide includes an axially extending post, said post having a pair of guiding discs extending radially outwardly from said post, one of said pair of discs being axially offset from the other one of said pair of discs, each of said pair of discs having a diameter corresponding to a diameter of said second through-bore of said plunger portion at said back end.

9. The actuator of claim 6 wherein said guide further includes a stop feature configured to minimize contact of said back end of said plunger portion with said closed end of said cavity.

10. The actuator of claim 1 wherein said bobbin includes an annular secondary plate formed of magnetic material insert molded therein, said bobbin being configured to provide an annular isolation layer between an inner diameter of said secondary plate and said plunger portion in said cavity.

11. An actuator for controlling a valve, said actuator comprising:
a frame having a longitudinal axis;
a bobbin disposed in said frame, said bobbin having a central cavity, said bobbin further including an outer winding surface;
a coil wound on said winding surface of said bobbin for producing a magnetic field in at least said central cavity in response to a control signal applied thereto; and
a plunger assembly movably disposed in said central cavity, said plunger assembly having a plunger portion secured to a rod portion, said plunger portion comprising magnetic material, said rod portion comprising plastic material configured to allow a predetermined amount of elastic deformation, said rod portion being removably secured to said plunger portion by way of a snap fit onto a forward end of said plunger portion,
said rod portion having a first through-bore, said plunger portion having a second through-bore, said first through-bore being in communication with said second through-bore when said rod portion is secured to said plunger portion, said first and second through-bores being configured for fluid flow,
said cavity including a closed end, said bobbin further including a guide axially extending from said closed end into said cavity, said guide being configured to align said plunger assembly within said cavity, said plunger portion including a back end axially opposite said forward end, said second through-bore at said back end being configured to receive said guide therein, said guide including an axially extending post, said post having a pair of guiding discs extending radially outwardly from said post, one of said pair of discs being axially offset from the other one of said pair of discs, each of said pair of discs having a disc diameter corresponding to a plunger-bore diameter of said second through-bore of said plunger portion at said back end.

12. The actuator of claim 11 wherein said first through-bore being in registry with said second through-bore.

13. The actuator of claim 12 wherein said rod portion has a first end having a funnel shape, said forward end of said plunger portion having a conical shape corresponding to said funnel shape.

14. The actuator of claim 13 wherein said first and second through-bores are configured for fluid damping and compensation of hydraulic forces in said actuator.

15. The actuator of claim 14 wherein said guide further includes a stop feature configured to minimize contact of said back end of said plunger portion with said closed end of said cavity.

16. The actuator of claim 15 wherein said bobbin includes an annular secondary plate formed of magnetic material insert molded therein, said bobbin being configured to provide an annular isolation layer between an inner diameter of said secondary plate and said plunger portion in said cavity.

* * * * *